UNITED STATES PATENT OFFICE.

JOHANNA GERLITZ, OF PHILADELPHIA, PENNSYLVANIA.

IMPROVEMENT IN BITTERS.

Specification forming part of Letters Patent No. 171,658, dated January 4, 1876; application filed November 17, 1874.

*To all whom it may concern:*

Be it known that I, JOHANNA GERLITZ, of the city and county of Philadelphia, and State of Pennsylvania, have invented a new and useful Composition, being a Bitters; and I do hereby declare the following to be a full, clear, and exact description of the nature thereof, sufficient to enable others skilled in the art to which my invention appertains to fully understand, make, and use the same.

My invention consists of a bitters, the chief ingredient thereof being convallaria or Solomon's seal, which has tonic virtues.

In compounding the medicine I employ the following ingredients: Two quarts of best brandy, three ounces of kümmel-seed, three ounces of fennel-seed, one ounce of malurt or wormwood, three ounces of wild-cherry bark, one-half ounce of convallaria-root, two ounces of orange-peel, one ounce of lavender, three gallons of water. These articles are united and well mixed. The essence of the solid matters may be obtained by decocting, digesting, or steeping, after which the compound is decanted, the result being a preparation which will be found eminently serviceable for the purposes above stated.

The dose applied internally will be regulated according to requirements.

Having thus described my invention, what I claim as new, and desire to secure by Letters Patent, is—

The composition—being a bitters—consisting of brandy, kümmel-seed, fennel-seed, wormwood, wild-cherry bark, convallaria-root, orange-peel, lavender and water, substantially in the proportions described.

JOHANNA GERLITZ.

Witnesses:
JOHN A. WIEDERSHEIM,
A. P. GRANT.